US012613485B2

(12) United States Patent
Watatani et al.

(10) Patent No.: US 12,613,485 B2
(45) Date of Patent: Apr. 28, 2026

(54) IMAGE FORMING APPARATUS CAPABLE OF SHIFTING FIXING UNIT VERTICALLY UPWARD IN CONJUNCTION WITH BEHAVIOR OF SWITCHING STATE OF FIXING MEMBER AND PRESSING MEMBER

(71) Applicant: KYOCERA Document Solutions Inc., Osaka (JP)

(72) Inventors: Tomohiro Watatani, Osaka (JP); Masakazu Uehara, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 0 days.

(21) Appl. No.: 19/053,697

(22) Filed: Feb. 14, 2025

(65) Prior Publication Data

US 2025/0264833 A1 Aug. 21, 2025

(30) Foreign Application Priority Data

Feb. 19, 2024 (JP) ................................ 2024-023264

(51) Int. Cl.
*G03G 15/20* (2006.01)
*G03G 15/00* (2006.01)
*G03G 21/20* (2006.01)

(52) U.S. Cl.
CPC ..... *G03G 15/2064* (2013.01); *G03G 15/2028* (2013.01); *G03G 15/657* (2013.01); *G03G 21/206* (2013.01); *G03G 2215/00413* (2013.01)

(58) Field of Classification Search
CPC ........... G03G 15/2064; G03G 15/2028; G03G 15/657; G03G 21/206; G03G 2215/00413; G03G 15/2017
See application file for complete search history.

(56) References Cited

U.S. PATENT DOCUMENTS

2012/0002997 A1* 1/2012 Hiraoka ............. G03G 15/2064 399/92
2013/0051831 A1* 2/2013 Shinagawa .......... G03G 21/206 399/329
2018/0314197 A1* 11/2018 Konishi ............. G03G 15/2017

FOREIGN PATENT DOCUMENTS

JP 2006113467 A 4/2006

* cited by examiner

*Primary Examiner* — Sandra Brase
(74) *Attorney, Agent, or Firm* — IP Business Solutions, LLC.

(57) ABSTRACT

An image forming apparatus includes: a drum unit; a fixing unit including a fixing member and a pressing member; a fixing pressure release unit disposed below the fixing unit; a body frame including a lateral support plate and a partition plate; a cooling fan; a first cooling duct; and a shifting mechanism. The first cooling duct is provided on an outside of the lateral support plate. The lateral support plate is provided with an air outlet. The fixing pressure release unit includes a nip pressure adjustment gear and a rotary gear. The fixing unit performs a switching behavior of switching a state of the fixing member and the pressing member between a pressed state and a released state by a rotary drive force supplied from the rotary gear to the nip pressure adjustment gear. The shifting mechanism shifts the fixing unit vertically upward in conjunction with the switching behavior.

4 Claims, 9 Drawing Sheets

IMAGE FORMING APPARATUS CAPABLE OF SHIFTING FIXING UNIT VERTICALLY UPWARD IN CONJUNCTION WITH BEHAVIOR OF SWITCHING STATE OF FIXING MEMBER AND PRESSING MEMBER

INCORPORATION BY REFERENCE

This application claims priority to Japanese Patent Application No. 2024-023264 filed on 19 Feb. 2024, the entire contents of which are incorporated by reference herein.

BACKGROUND

The present disclosure relates to image forming apparatuses and particularly relates to a technique for reducing temperature loss of a fixing unit.

A general image forming apparatus includes: a photosensitive drum as an image carrier; a charging device that electrically charges the photosensitive drum; an exposure device that irradiates the charged surface of the photosensitive drum with laser light based on an original document to form a latent image of the original document on the surface of the photosensitive drum; a developing device that visualizes the latent image with toner; a transfer roller that transfers a toner image formed by the visualization to a recording paper sheet; a fixing device that fixes the transferred toner image on the recording paper sheet; and a cleaning device that removes residual toner on the surface of the photosensitive drum.

Recently, with the downsizing of image forming apparatuses, the space between units in the interior of such an apparatus has become narrower and, thus, a drum unit including a photosensitive drum has been disposed near a fixing unit including a fixing device. When heat for fixing in the fixing device is transferred to the drum unit, the drum unit may be adversely affected.

As a solution to the above problem, there is generally known a technique in which a heat insulating member is provided between the fixing unit and the drum unit (a process cartridge) to insulate between the drum unit and the fixing unit, thus preventing heat transfer from the fixing unit to the drum unit.

SUMMARY

A technique improved over the aforementioned technique is proposed as one aspect of the present disclosure.

An image forming apparatus according to an aspect of the present disclosure includes a drum unit, a fixing unit, a fixing pressure release unit, a body frame, a cooling fan, and a first cooling duct. The drum unit includes an image carrier capable of carrying a toner image. The fixing unit includes a fixing member and a pressing member forming a fixing nip together with the fixing member and fixes at the fixing nip the toner image formed on a recording sheet. The fixing pressure release unit is disposed below the fixing unit and switches a state of the fixing member and the pressing member between a pressed state where pressure is applied on the fixing nip and a released state where the pressure on the fixing nip is released. The body frame includes: a vertically extending lateral support plate; and a partition plate disposed above the fixing unit and serving as a partition between the drum unit from the fixing unit. The cooling fan produces a cooling air flow. The first cooling duct is provided on an outside of the lateral support plate and allows the air blown by the cooling fan to flow therethrough. The lateral support plate is provided with an air outlet through which the air in the cooling duct is to be blown into a space between the drum unit and the fixing unit. The fixing pressure release unit includes: a nip pressure adjustment gear located toward the fixing unit; and a rotary gear located below and meshing with the nip pressure adjustment gear. The fixing unit performs a switching behavior of switching between the pressed state and the released state by a rotary drive force supplied by rotation from the rotary gear to the nip pressure adjustment gear. The image forming apparatus further includes a shifting mechanism that shifts the fixing unit vertically upward in conjunction with the switching behavior.

DETAILED DESCRIPTION

Figure 1:
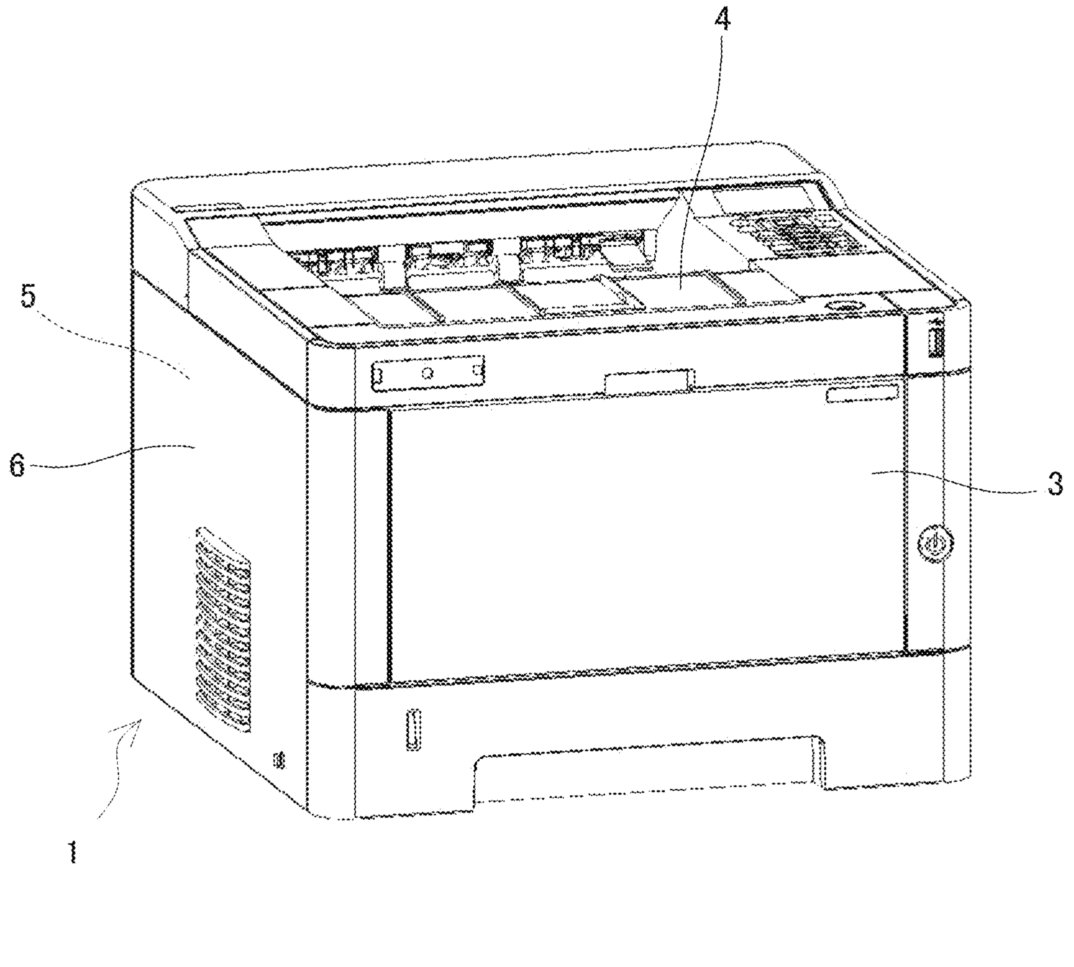
FIG. 1 is a perspective view showing an appearance of an image forming apparatus.
Figure 2:
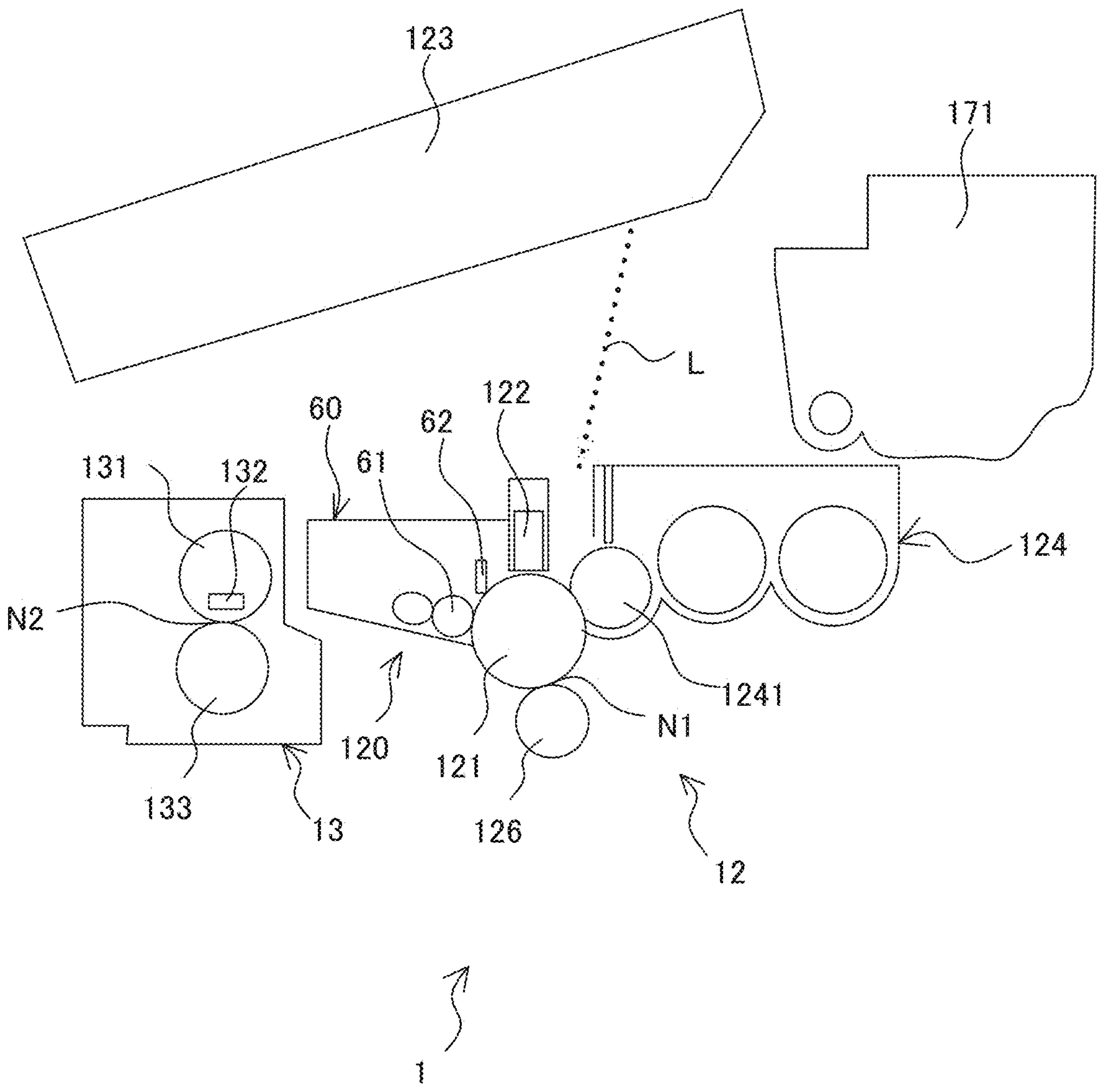
FIG. 2 is a cross-sectional side view schematically showing an image forming device and its surrounding components in the image forming apparatus.

Hereinafter, a description will be given of an image forming apparatus according to an embodiment of the present disclosure with reference to the drawings. FIG. 1 is a perspective view showing an appearance of an image forming apparatus 1 according to an embodiment of the present disclosure. FIG. 2 is a cross-sectional side view schematically showing an image forming device 12 and its surrounding components in the image forming apparatus 1. The image forming apparatus 1 is, for example, a printer.

Figure 5A:
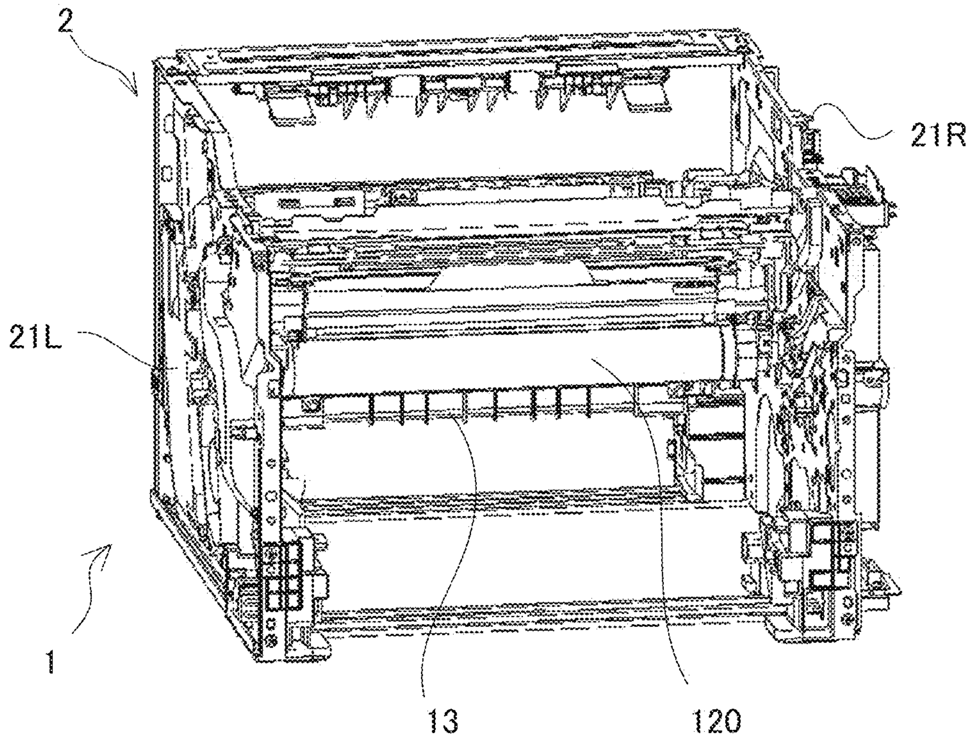
FIG. 5A is a perspective view showing the structure of a body frame of the image forming apparatus.

The image forming apparatus 1 contains an image forming device 12 in the interior of a body frame 2 (see FIG. 5A). The body frame 2 includes respective openings formed in the front side, the top side, and the back side thereof and these openings are covered with a front cover 3, a top cover 4, and a back cover 5, respectively. The right and left sides of the image forming apparatus 1 are covered with respective side covers 6.

Each of the front cover 3 and the top cover 4 is pivotally supported by the body frame 2 and can be thus opened and closed between a position to uncover the associated opening of the body frame 2 and a position to cover it. With the front cover 3 and the top cover 4 opened, a toner container 171, a developing device 124, and a drum unit 120 can be removed and attached through the openings of the body frame 2.

The image forming device 12 forms a toner image on a recording paper sheet as a recording sheet. The image forming device 12 includes a photosensitive drum 121, a charging device 122, an exposure device 123, the developing device 124, a transfer roller 126, a cleaning device 60, and the toner container 171. The photosensitive drum 121, the charging device 122, and the cleaning device 60 are formed into a unit to form the drum unit 120.

The photosensitive drum 121 is an image carrier capable of carrying a toner. The photosensitive drum 121 is formed rotatably about an axis of rotation and is capable of carrying a toner image on its surface. The charging device 122 has the function of electrically charging the surface of the photosensitive drum 121. The exposure device 123 irradiates the surface of the photosensitive drum 121 with laser light L based on image data sent from an external device (for example, a personal computer) to form a latent image on the surface of the photosensitive drum 121.

The developing device 124 includes a developing roller 1241. The developing device 123 visualizes, with toner, the latent image formed on the surface of the photosensitive drum 121. The transfer roller 126 forms a transfer nip N1 together with the photosensitive drum 121. The transfer roller 126 transfers the toner image to a recording paper sheet.

The cleaning device 60 includes a cleaning roller 61 and a cleaning blade 62. The cleaning roller 61 and the cleaning blade 62 make contact with the surface of the photosensitive drum 121 and remove residual toner, deposits, and the like on the surface of the photosensitive drum 121 to clean the surface of the photosensitive drum 121.

The fixing unit 13 fixes the toner image on the recording paper sheet by the application of heat and pressure. The fixing unit 13 includes: a heat roller 131 with a heater 132 built therein; and a pressure roller 133. The heat roller 131 and the pressure roller 133 are opposed to each other. While the recording paper sheet is nipped and conveyed in a fixing nip N2 formed by the heat roller 131 and the pressure roller 133, the unfixed toner image is melted by heat from the heater 132 and fixed on the recording paper sheet by pressure from the heat roller 131 and the pressure roller 133. The heat roller 131 and the pressure roller 133 are respective examples of the fixing member and the pressing member defined in CLAIMS.

Figure 3:
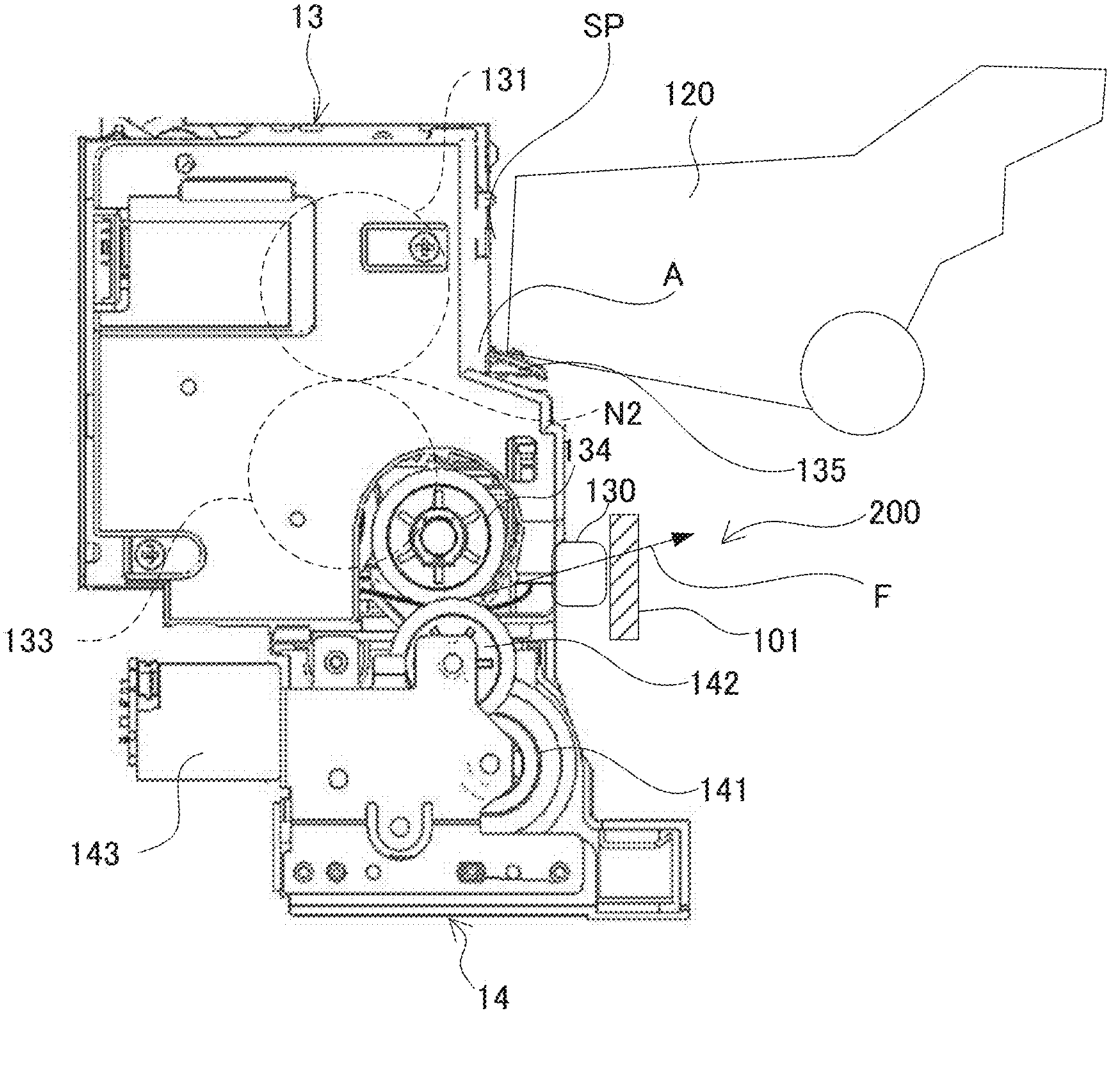
FIG. 3 is a side view schematically showing a fixing unit and its surrounding components.

FIG. 3 is a side view schematically showing the fixing unit 13 and its surrounding components. A space SP is a space formed between the drum unit 120 and the fixing unit 13.

The fixing pressure release unit 14 is provided below the fixing unit 13. The fixing pressure release unit 14 switches the state of the fixing nip N2 by switching the state of the heat roller 131 and the pressure roller 133 between a pressed state where pressure is applied on the fixing nip N2 (a state where the pressure roller 133 presses against the heat roller 131) and a released state where the pressure on the fixing nip N2 is released (a state where the upward pressing of the pressure roller 133 against the heat roller 131 is released).

The fixing pressure release unit 14 includes: a gear train composed of a first gear 141, a second gear 142 (an example of the rotary gear), and so on; and a drive motor 143 capable of forward and backward rotation. The fixing pressure release unit 14 transmits a drive force from the drive motor 143 via the gear train to the fixing unit 13.

The fixing unit 13 includes the heat roller 131, the pressure roller 133, a third gear 134 (an example of the nip pressure adjustment gear), and a guide member 135. For example, when the drive force from the drive motor 143 of the fixing pressure release unit 14 is transmitted via the first gear 141, the second gear 142, the third gear 134, and so on to an eccentric cam provided in the interior of the fixing unit 13 to drive the eccentric cam into rotation, the state of the fixing nip N2 switches to the pressed state or the released state.

When the pressure roller 133 is pressed against the heat roller 131 by a biasing member, the fixing nip N2 reaches the pressed state. When the eccentric cam is rotated a predetermined angle forwardly and backwardly, the state of the fixing nip N2 switches between the released state where the pressure roller 133 is disengaged from the heat roller 131 and the pressed state where the pressure roller 133 presses against the heat roller 131.

In driving the eccentric cam into rotation for the purpose of switching from the pressed state to the released state, a driving force acts between the third gear 134 and the second gear 142 in order to rotate the eccentric cam. On the other hand, in driving the eccentric cam into rotation for the purpose of switching from the released state to the pressed state, a turning moment acts on the eccentric cam by the biasing member and, thus, a braking force acts between the third gear 134 and the second gear 142. By the driving force or braking force between the third gear 134 and the second gear 142, a force acting upward is transmitted to the fixing unit 13.

When the second gear 142 rotates clockwise in FIG. 3, the third gear 134 meshing with the second gear 142 rotates counterclockwise in FIG. 3 and, thus, a drive force from the drive motor 143 is transmitted from the tooth flanks of the second gear 142 to the tooth flanks of the third gear 134. On the other hand, when the second gear 142 rotates counterclockwise to rotate the third gear 134 clockwise, the third gear 134 pushes the tooth flanks of the second gear 142 and, thus, a braking force is transmitted to the third gear 134.

The arrow F in FIG. 3 vectorially represents a force transmitted from the tooth flanks of the second gear 142 to the tooth flanks of the third gear 134 in association with the drive force and braking force acting on the third gear 134. The direction indicated by the arrow F is a direction of the vector of the transmitted force.

In the combinational structure of the fixing unit 13 and the fixing pressure release unit 14 shown in FIG. 3, the transmitted force F is inclined upwardly to the right in FIG. 3 and therefore has a rightward component and an upward component. Hence, the transmitted force F applies to the fixing unit 13 a force to move the fixing unit 13 upward.

The guide member 135 extends in a direction orthogonal to the direction of conveyance of a recording paper sheet (in a direction along the depth of the plane of FIG. 3), holds down the top surface of a recording paper sheet being conveyed from the drum unit 120, and guides the recording paper sheet to the entrance of the fixing nip N2.

The guide member 135 is pivotally movable about a rotational shaft A extending in the direction orthogonal to the direction of conveyance of a recording paper sheet. The guide member 135 shifts between a first position (the position shown in FIG. 3) to guide a recording paper sheet to the entrance to the fixing nip N2 and a second position to close the entrance to the fixing nip N2.

The guide member 135 is pivotally moved about the rotational shaft A by a link mechanism. For example, when the drum unit 120 is fitted into the body frame 5, part of the drum unit 120 works on the link mechanism to pivotally move the guide member 135 about the rotational axis A and thus shift the guide member 135 from the second position to the first position.

Alternatively, a structure may be adopted in which the rotational shaft A is connected to the first gear 134, the guide member 135 shifts to the first position when the fixing nip N2 reaches the pressed state, and the guide member 135 shifts to the second position when the fixing nip N2 reaches the released state.

A controller formed of a CPU or the like governing the operation control of the image forming apparatus 1 controls a drive source to shift the guide member 135 to either the first position or the second position. When the fixing pressure release unit 14 puts the fixing nip N2 of the fixing unit 13 into the pressed state, the controller controls the drive source to shift the guide member 135 to the first position. On the other hand, when the fixing pressure release unit 14 puts the fixing nip N2 of the fixing unit 13 into the released state, the controller controls the drive source to shift the guide member 135 to the second position.

Figure 4A:
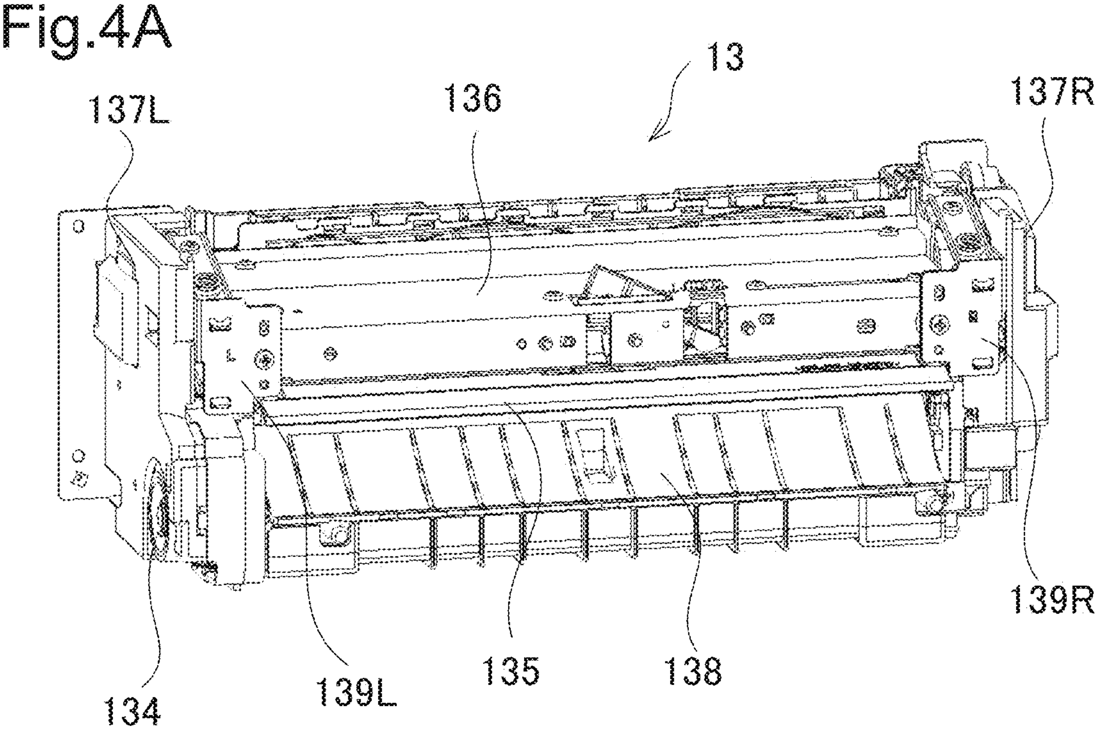
FIG. 4A is a perspective view showing the fixing unit.
Figure 4B:
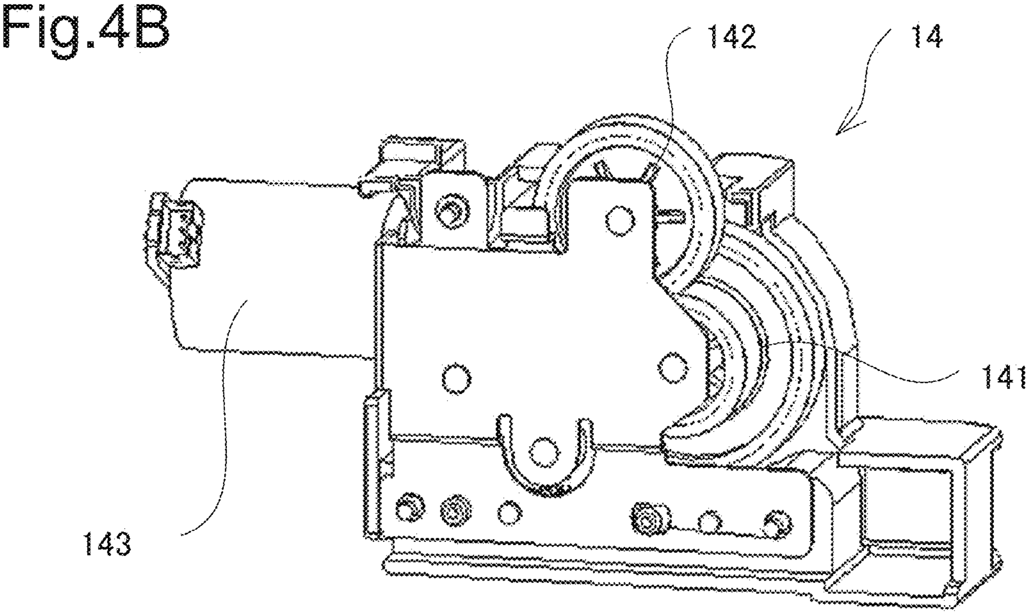
FIG. 4B is a perspective view showing a fixing pressure release unit.

FIG. 4A is a perspective view showing the fixing unit 13 and FIG. 4B is a perspective view showing the fixing pressure release unit 14. The fixing unit 13 includes the guide member 135, a case 136 extending in the right-to-left direction, a pair of right and left covers 137R and 137L, a conveyance guide 138, and shield members 139R and 139L (hereinafter, also referred to simply as "shield members 139"). The conveyance guide 138 guides a recording paper sheet conveyed from the drum unit 120 to the fixing nip N2. The shield members 139R and 139L will be described in detail later.

Figure 5B:
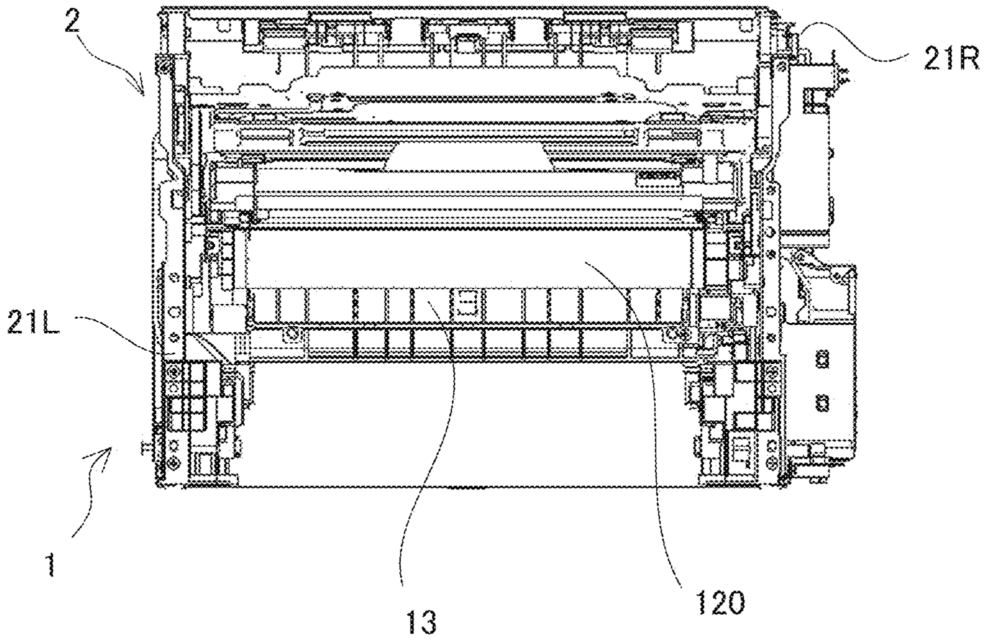
FIG. 5B is a front view showing the structure of the body frame.

FIG. 5A is a perspective view showing the structure of the body frame 2 of the image forming apparatus 1 and FIG. 5B is a front view showing the structure of the body frame 2. The body frame 2 includes a pair of lateral support plates 21L, 21R extending in the vertical direction. The lateral support plate 21L is provided on the left side of the body frame 2, while the lateral support plate 21R is provided on the right side of the body frame 2. The drum unit 120 and the fixing unit 13 are fitted into a space defined by the lateral side plates 21L and 21R.

Figure 6A:
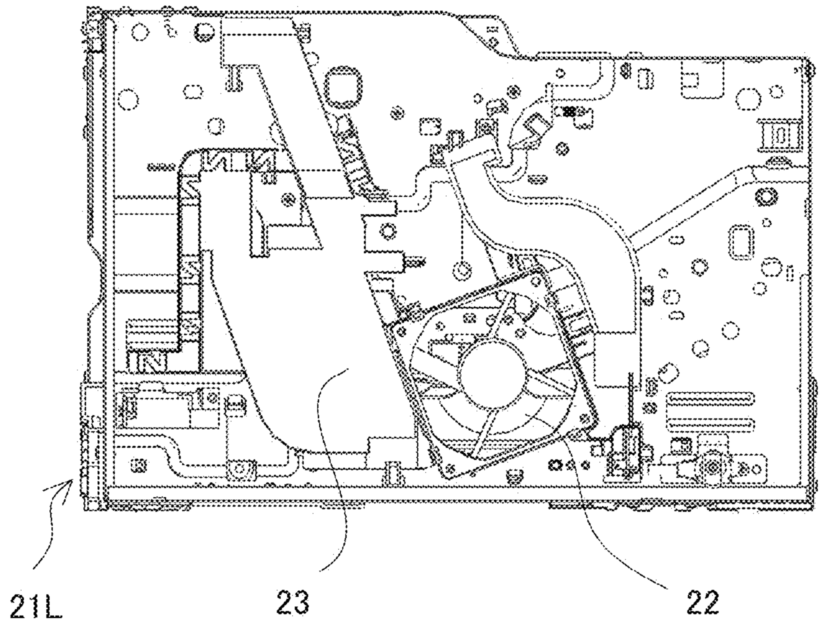
FIG. 6A is a side view showing the structure of a lateral support plate of the body frame.

FIG. 6A is a side view showing the structure of the lateral support plate 21L of the body frame 2. The outside surface of the lateral support plate 21L is provided with: a cooling fan 22 capable of producing a cooling air flow; and a cooling duct 23 through which the air blown by the cooling fan 22 flows.

Figure 6B:
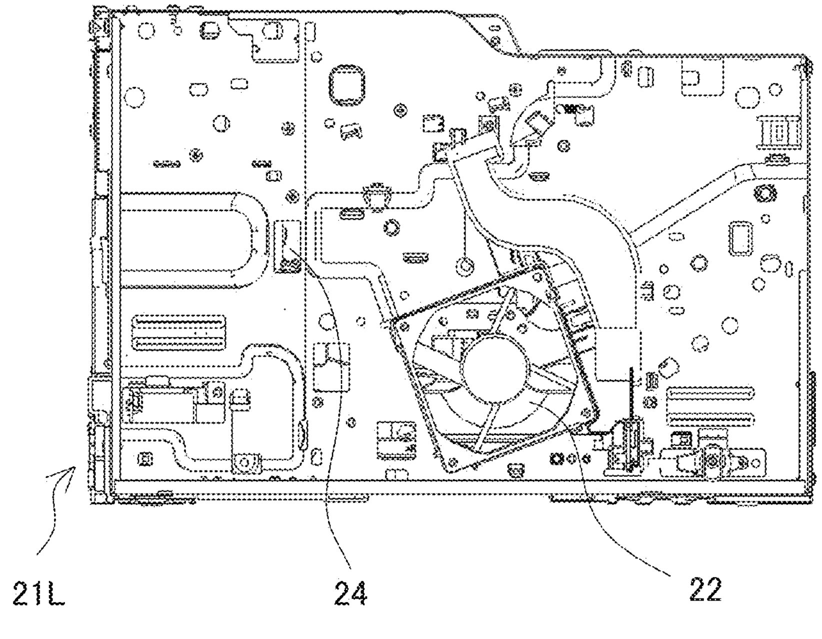
FIG. 6B is a view showing a state where a cooling duct is removed from the lateral support plate.
Figure 7A:
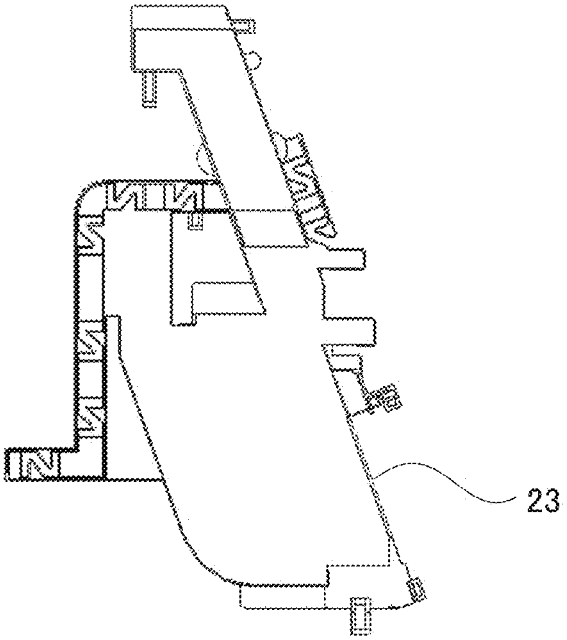
FIG. 7A is a side view showing the cooling duct.
Figure 7B:
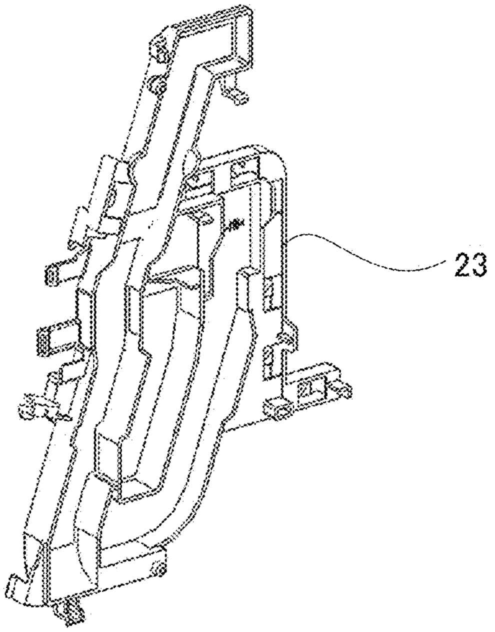
FIG. 7B is a perspective view showing the inside of the cooling duct.

FIG. 6B is a view showing a state where the cooling duct 23 is removed from the lateral support plate 21L. FIG. 7A is a side view showing the cooling duct 23 and FIG. 7B is a perspective view showing the inside of the cooling duct 23. As shown in FIG. 6B, the lateral support plate 21L is provided with an air outlet 24 through which the air in the cooling duct 23 is to be blown into the space between the drum unit 120 and the fixing unit 13.

Figure 8:
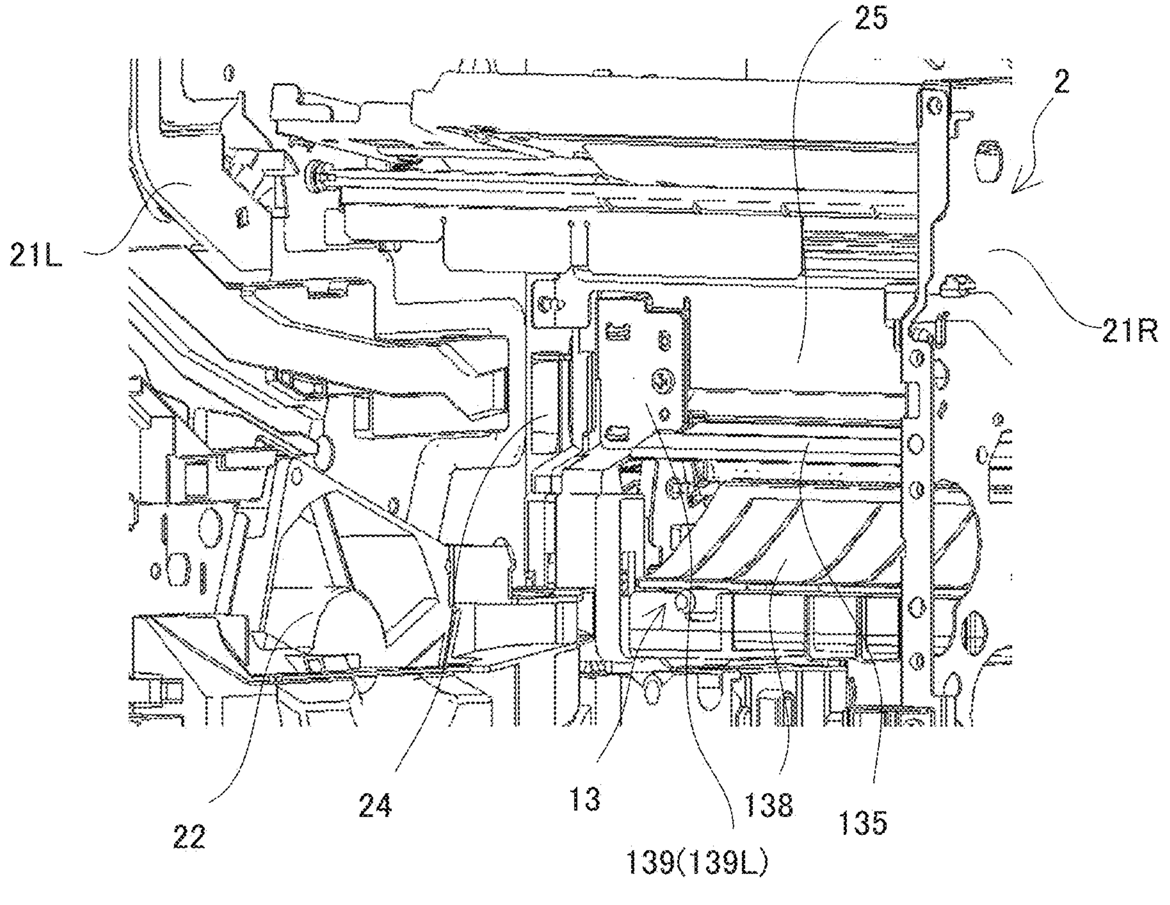
FIG. 8 is a perspective view of an air outlet and its surrounding portions, with a drum unit removed from the body frame, when viewed from the right front.
Figure 9A:
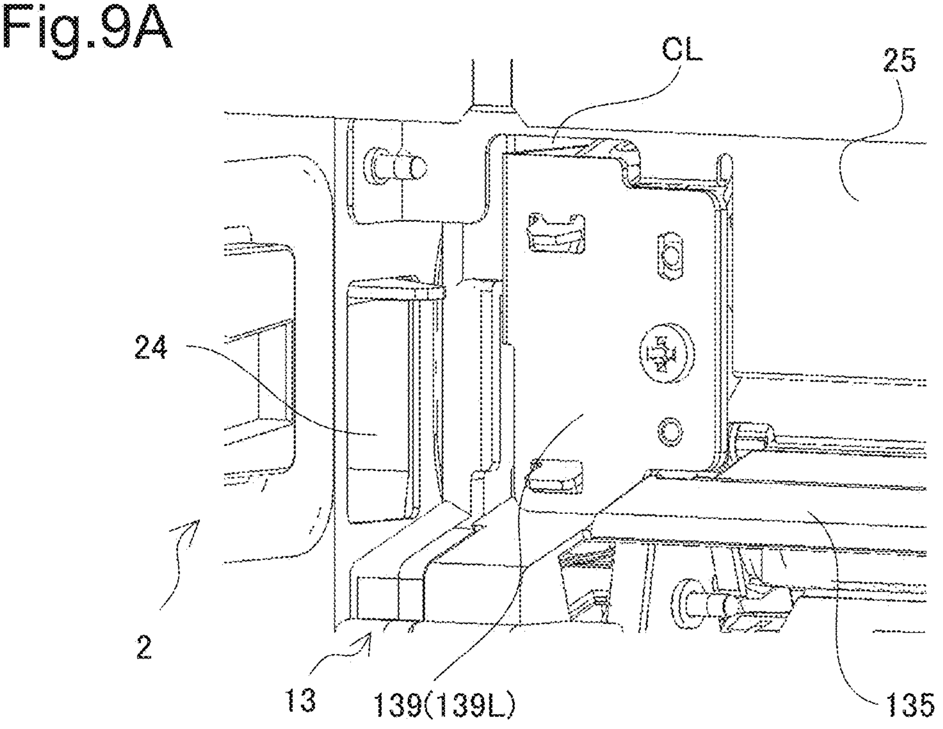
FIGS. 9A and 9B are enlarged views of a portion of FIG. 8.
Figure 9B:
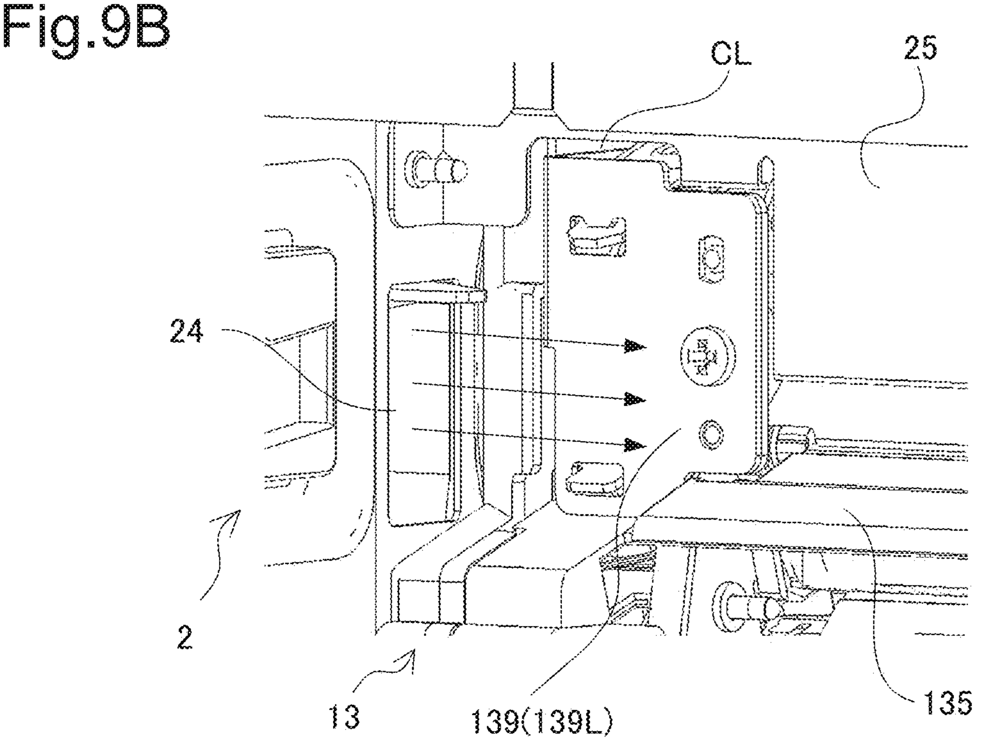

FIG. 8 is a perspective view of the air outlet 24 and its surrounding portions, with the drum unit 120 removed from the body frame 2, when viewed from the right front. FIGS. 9A and 9B are enlarged views of a portion of FIG. 8. In FIG. 9B, the arrows show a direction of flow of a cooling air from the air outlet 24.

The cooling air from the air outlet 24 flows through the space SP (see FIG. 3) formed between the drum unit 120 and the fixing unit 13. As shown in FIGS. 8, 9A, and 9B, the body frame 2 includes a partition plate 25. The partition plate 25 is disposed above the fixing unit 13 and serves as a partition between the drum unit 120 from the fixing unit 13. The shield members 139 included in the fixing unit 13 block openings formed between the body of the fixing unit 13 and the partition plate 25. A clearance CL is a clearance produced between each of the shield members 139 (the fixing unit 13) and the partition plate 25.

The image forming apparatus 1 includes a shifting mechanism 200. The shifting mechanism 200 shifts the fixing unit 13 vertically upward in conjunction with the operation of the fixing pressure release unit 14 for switching the fixing nip N2 between the pressed state and the released state. When the shifting mechanism 200 shifts the fixing unit 13 vertically upward, the shield members 130 move upward.

Thus, the clearances CL formed between the fixing unit 13 and the partition plate 25 are covered by the shield members 139 and, as a result, become narrower than when the fixing nip N2 is in the released state before the fixing unit 13 shifts upward.

In other words, the fixing unit 13 performs a switching behavior of switching between the pressed state and the released state by a rotary drive force supplied by rotation from the second gear 142 to the third gear 134. The structure in the interior of the image forming apparatus 1 for shifting, at this time, the fixing unit 13 vertically upward in conjunction with the switching behavior is the shifting mechanism 200.

As thus far described, the fixing unit 13 receives, from the second gear 142 via the third gear 134, a force to move the fixing unit 13 upward, the force originating from a drive force of the drive motor 143 of the fixing pressure release unit 14. This force to move the fixing unit 13 upward enables the fixing unit 13 to vertically shift. Specifically, in order to transmit to the fixing unit 13 the force to move it upward contained in the transmitted force F, the shifting mechanism 200 restricts horizontal movement of the fixing unit 13 resulting from a horizontal moving force to move the fixing unit 13 horizontally, the horizontal moving force being contained in the transmitted force F.

In this embodiment, a raised portion 130 is provided on the side of the fixing unit 13 facing in the horizontal direction which is a direction in which the fixing unit 13 is to be moved by the above horizontal moving force contained in the transmitted force F. In the interior of the apparatus body (the body frame 2) of the image forming apparatus 1, a restriction member 101 is provided in abutment or abuttably via a gap d against the raised portion 130 in the horizontal direction. The gap d has a predetermined magnitude of distance that allows the fixing unit 13 to move horizontally.

When the fixing unit 13 attempts to horizontally move by the above horizontal moving force contained in the transmitted force F, the restriction member 101 restricts horizontal movement of the fixing unit 13. Thus, only the force to move the fixing unit 13 upward contained in the transmitted force F acts on the fixing unit 13 and, as a result, the fixing unit 13 shifts upward. The raised portion 130 and the restriction member 101 constitute the shifting mechanism 200.

Furthermore, in a state where the fixing nip N2 is put into the pressed state by the above switching behavior of the fixing unit 13, the clearances CL are covered with the shield members 139. At this time, the guide member 135 having shifted to the first position forms, together with the outside wall surface of the drum unit 120 facing to the fixing unit 13 and the outside wall surface of the fixing unit 13 facing to the drum unit 120, a cooling duct that leads a cooling air blown out through the air outlet 24 toward the drum unit 120.

In other words, when the clearances CL are covered with the shield members 139, the guide member 135 having shifted to the first position takes a position where the above cooling duct can be formed. Although in this embodiment a structure in which the guide member 135 pivotally moves about the rotational shaft A to form a cooling duct is adopted as an example, the fixing unit 13 may be provided with an alternative member for forming a cooling duct instead of the guide member 135.

If, as in the general technique described previously, a heat insulating member is disposed between the fixing unit and the drum unit, this makes it difficult to downsize the apparatus.

For the purpose of providing heat insulation between the drum unit and the fixing unit, an alternative technique of passing a cooling air flow between the drum unit and the fixing unit can be proposed. However, if a fixing belt in the fixing unit is cooled by the cooling air flow, there may arise another problem of a decrease in energy saving performance of the fixing unit.

If the body frame of the image forming apparatus is provided with a partition plate serving as a partition between the drum unit and the fixing unit, it may be possible to prevent the cooling air passing between the drum unit and the fixing unit from flowing into the fixing unit. However, even in this case, the cooling air may flow into the fixing unit through clearances formed between the fixing unit and the partition plate and, thus, the fixing unit may be cooled. These clearances are necessary for the convenience of assembly of the apparatus.

This problem can be solved in the above embodiment, wherein the clearances CL formed between the fixing unit 13 and the partition plate 25 can be narrowed to reduce the amount of cooling air flowing into the fixing unit 13. In addition, since the clearances CL are covered with the shield members 139, this makes it possible to allow the cooling air to flow through the space SP between the drum unit 120 and the fixing unit 13. Therefore, the temperature rise of the drum unit 120 can also be reduced. Hence, the above embodiment enables effective reduction in temperature loss of the fixing unit 13 and reduction in temperature rise of the drum unit 120.

Furthermore, since the outside wall surface of the drum unit 120 facing to the fixing unit 13, the outside wall surface of the fixing unit 13 facing to the drum unit 120, and the guide member 135 included in the fixing unit 13 serve as a cooling duct that leads the cooling air toward the drum unit 120, the drum unit 120 can be effectively cooled by the cooling air flow from the cooling fan 22.

The present disclosure is not limited to the structure of the above embodiment and can be modified in various ways. The structure and processing of the above embodiment described with reference to FIGS. 1 to 9B is merely an embodiment of the present disclosure and is not intended to limit the present disclosure to the above structure and processing.

While the present disclosure has been described in detail with reference to the embodiments thereof, it would be apparent to those skilled in the art the various changes and modifications may be made therein within the scope defined by the appended claims.

What is claimed is:

1. An image forming apparatus comprising:

a drum unit including an image carrier capable of carrying a toner image;

a fixing unit that includes a fixing member and a pressing member forming a fixing nip together with the fixing member and fixes at the fixing nip the toner image formed on a recording sheet;

a fixing pressure release unit which is disposed below the fixing unit and switches a state of the fixing member and the pressing member between a pressed state where pressure is applied on the fixing nip and a released state where the pressure on the fixing nip is released;

a body frame including a vertically extending lateral support plate, and a partition plate disposed above the fixing unit and serving as a partition between the drum unit from the fixing unit;

a cooling fan that produces a cooling air flow, and a first cooling duct which is provided on an outside of the lateral support plate and allows the air blown by the cooling fan to flow therethrough, wherein the lateral support plate is provided with an air outlet through which the air in the first cooling duct is to be blown into a space between the drum unit and the fixing unit, the fixing pressure release unit comprises a nip pressure adjustment gear located toward the fixing unit, and a rotary gear located below and meshing with the nip pressure adjustment gear, the fixing unit performs a switching behavior of switching between the pressed state and the released state by a rotary drive force supplied by rotation from the rotary gear to the nip pressure adjustment gear, and the image forming apparatus further comprises a shifting mechanism that shifts the fixing unit vertically upward in conjunction with the switching behavior.

2. The image forming apparatus according to claim 1, wherein the fixing unit comprises a shield member that blocks an opening formed between a body of the fixing unit and the partition plate, and when the fixing unit is shifted upward in conjunction with the switching behavior by the fixing pressure release unit and the shifting mechanism, the shield member moves to a position where a clearance formed between the shield member and the partition plate becomes narrower.

3. The image forming apparatus according to claim 1, wherein the fixing unit comprises a guide member extending in a direction orthogonal to a direction of conveyance of the recording sheet, the guide member guiding the recording sheet to an entrance to the fixing nip, the cooling fan is provided adjacent to the fixing unit, an apparatus body of the image forming apparatus is provided with the air outlet through which the cooling air from the cooling fan is to be blown into the space between the drum unit and the fixing unit, and when the drum unit is fitted into the body frame, the guide member forms, together with an outside wall surface of the drum unit facing to the fixing unit and an outside wall surface of the fixing unit facing to the drum unit, a second cooling duct through which the cooling air blown out through the air outlet flows.

4. The image forming apparatus according to claim 1, wherein the shifting mechanism comprises:

a raised portion provided on a horizontal side of the fixing unit; and a restriction member provided in abutment or abuttable via a gap against the raised portion in the horizontal direction.

* * * * *